SELF-STAKING INSERT

Original Filed Feb. 10, 1966

INVENTORS
ARTHUR R. BREED
EDWARD A. ANDERSON
BY Hoffmann and Yount
ATTORNEYS

United States Patent Office

Re. 27,143
Reissued June 22, 1971

27,143
SELF-STAKING INSERT

Arthur R. Breed, Euclid, Ohio, and Edward A. Anderson, deceased, late of Cleveland Heights, Ohio, by Phyllis T. Anderson, legal representative, Cleveland Heights, Ohio, assignors to The Lamson & Sessions Co., Cleveland, Ohio Original No. 3,399,705, dated Sept. 3, 1968, Ser. No. 526,604, Feb. 10, 1966. Application for reissue July 30, 1969, Ser. No. 862,984
Int. Cl. F16b *39/00*
U.S. Cl. 151—41.73 14 Claims

Matter enclosed in heavy brackets [ ] appears in the original patent but forms no part of this reissue specification; matter printed in italics indicates the additions made by reissue.

ABSTRACT OF THE DISCLOSURE

A self-staking insert having a polygonal shank wherein the sides are planar and adjacent sides of the polygon are joined by arcuately curved surfaces so as to provide a continuous peripheral surface which approaches circularity, a bulge portion at the leading end of the shank which is wider than the receiving hole if prepunched and which tapers to a circular end face.

The present invention relates to a metal insert for sheet or plate members and more particularly to a self-staking type of insert.

In the type of insert to which the present invention relates, a portion of the insert is received in an opening *in* the plate or sheet member and another part of the insert indents the sheet or plate member to cause material to flow around the first part to securely hold the insert against both removal and rotation. Certain structures of the prior art have utilized inserts with sharp edged grooves or knurls which bite into the material of the sheet or plate member for holding the insert against removal and rotation relative to the member. Such sharp edged structures cause stress concentrations in the sheet or plate which cause early propagation of fatigue cracks when the plate or sheet member is dynamically loaded. Moreover, the structures have not been adapted for use as punches and have not provided a noncircular body configuration where metal is flowed into substantially full circumferential contact with the body.

An object of the present invention is to provide a new and improved insert such as an internally threaded fastener of the self-staking type which may be used with a prepunched hole or to punch its own receiving opening in a plate or sheet member and which, when inserted, is held against rotation in the sheet or plate member, the insert being so constructed and arranged that stress concentrations in the plate or sheet member are kept to a minimum thus providing a strong assembly having a high fatigue life capability.

A further object of the present invention is to provide a new and improved metal insert, such as an internally threaded fastener, of the self-staking type for assembly into a sheet or plate member, the insert having a central projecting portion of polygonal configuration and a head portion for flowing the metal of the sheet or plate member into contact, preferably full circumferential contact, with the polygonal central portion as the insert is assembled to the member with the insert being such that it is securely held against rotation and stress concentrations in the sheet or plate member are minimized thus providing a strong assembly having a high fatigue life capability.

A further object of the present invention is to provide a new and improved insert having a projecting central portion adapted to be inserted into a prepunched hole in a sheet or plate member for receiving the insert or to punch a receiving opening in the sheet or plate member in cooperation with a conventional die with the insert being so constructed and arranged that maximum strength for punching purposes is obtainable in the projecting portion and the insert is securely held against rotation while the stress concentrations in the final assembly are held to a minimum.

A further object of the present invention is to provide a new and improved insert of the self-staking type in which a central projecting portion has a polygonal shape with the shape approaching that of a circle to provide maximum punching strength and to avoid setting up unnecessary stress concentrations and yet having sufficient angularity between the sides to securely hold the insert against rotation in a plate or sheet member.

A further object of the present invention is to provide a new and improved self-stacking insert, such as an internally threaded fastener, which has a projecting portion adapted to be received in a prepunched hole of a nominal diameter in a parent member to which it is to be assembled or to be used as a punch for punching a receiving opening in cooperation with a standard circular die, the insert being so constructed and arranged that the projecting portion will hold the insert against rotation when inserted into a sheet or plate member with or without a prepunched hole and so that maximum strength can be obtained in the projecting portion.

Further objects and advantages of the present invention will be apparent from the following description thereof made with reference to the accompanying drawings forming a part of the present specification for all subject matter disclosed therein and in which.

Figure 1:
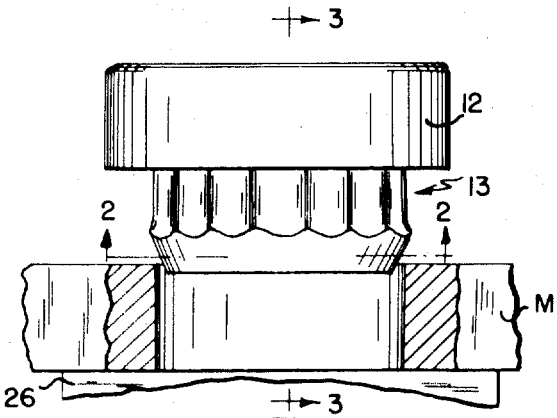
FIG. 1 is an elevational view with parts in section showing a self-staking nut embodying the present invention and a parent member for receiving the nut.

Referring to the drawings, the insert shown therein is a self-staking nut 10 having a head portion 12 and a central projection 13 adapted to be received in a prepunched opening or in a self-punched opening in a sheet or plate member into which the nut is to be attached. The head portion 12 extends laterally outwardly of the projection 13 at one end of the nut and a tapped opening 14 extends axially through the head portion 12 and the central projection 13. Conventionally, the outer side of the head portion 12 of the nut is considered the top of the nut.

The central projection 13 of the nut has a shank portion 13a which joins the head portion 12. The shank portion 13a, in cross section, has a polygonal configuration providing a continuous peripheral surface which is adapted to hold the nut against rotation when the nut is inserted into a plate or sheet member. In the illustrated and preferred embodiment, the polygonal configuration is that of a regular polygon having included angles between adjacent sides which are obtuse. In the preferred practice of the present invention, the regular polygon is such that a circle inscribing the polygon has a diameter no smaller than 80% of the diameter of the circle circumscribing the polygon and the diameter is no greater than that which will provide a three-thousandths inch clearance as a minimum between a side of the polygon and the circle circumscribing the polygon. The included angle between adjacent sides of the polygon may be as small as about 100° but preferably the shank portion 13a is at least hexagonal so that the included angle between adjacent sides is 120°. It will be noted that in the type of regular polygon described, the sides of the polygon form chords of the circle circumscribing the polygon. While the sides of the polygonal shank portion are planar, adjacent sides are joined by arcuately curved surfaces which provide the aforementioned continuous peripheral surface. However, the self-staking nut 10 could be constructed, for example, by providing a continuous peripheral surface on the body thereof which is configured to provide a sinusoidal periphery. The peripheral surface is termed continuous, since the shank portion is constructed so that there is no point on the periphery formed by the intersection of planar surfaces, that is, there are no portions of the periphery formed by a line.

The lower end of the polygonal shank portion 13a flares out outwardly and blends with a bulge portion 18 on the central projection. The polygonal sides of the shank portion 13a preferably extend along the bulge portion 18 to a point at which the diametrical extent of the bulge is maximum. The bulge 18 therefore has the same general cross-sectional configuration as the shank portion 13a. The central projection tapers from the bulge portion 18 to the outer end face 20 of the projection. The outer end face of the projection 13 is preferably more circular than the polygonal part of the projection and in the preferred and illustrated embodiment the portion of the projection immediately adjacent the outer end is generally frusto-conical in configuration and tapers outwardly to the maximum transverse dimension of the projection at the bulge 18. The taper of the frusto-conical portion, designated by the reference numeral 21, preferably extends at a maximum angle of about 15° with respect to the axis of the tapped opening. It will be noted that the tapered portion extends higher at the corners of the polygon than at the flats.

The underside of the head portion 12 includes a planar circumferentially continuous surface engageable with the plate or sheet member as the nut is inserted therein to effect flowing of the material of the plate or sheet into engagement with the periphery of the projection 13. In the preferred embodiment the underside of the head portion 12 is provided with an annular recess 22 immediately adjacent the central projection 13 which defines an indenting flange 23 having an annular surface 23a immediately outwardly of the recess 22. The recess 22 opens downwardly and the bottom thereof curves upwardly away from the annular surface 23a and then downwardly to blend with the central projection. The radius of curvature of the bottom of the curved recess is smaller immediately adjacent the projection and becomes progressively larger to provide a side surface 24 on the indenting flange which extends inwardly from the annular surface 23a and which is inclined to face toward the central projection 13.

The central projection 13 is designed so that the maximum transverse dimension of the polygonal shank portion 13 is approximately the same or even somewhat larger than the maximum transverse dimension of the outer end face 20. The outer end face 20 is, as mentioned above, dimensioned such that it will fit into a prepunched hole with which the nut is designed to be used and is preferably substantially circular. As the nut is inserted into a prepunched hole, as is shown in FIG. 1, the frusto-conical portion 21 will cause the material of the parent member to compress to allow the bulge 18 to pass through the material and the indenting flange 23 of the head portion will engage and indent the material of the sheet or plate member M to cause the material to flow around the polygonal shank portion of the nut.

The recess 22 causes the indenting forces to be concentrated at the annular bearing surface 23a on the indenting flange and this surface is designed to have an area such that the normal punching pressure will overcome the yield resistance of the material to permit the indenting flange 23 to indent itself into the material and to flow the material laterally to flow around and engage the polygonal projection 13 for substantially the entire circumferential extent thereof. The inclined surface 24 of the indenting flange 23 will aid in directing the flow of material inwardly against the polygonal portion.

It will be noted that the annular surface 23a is, in the preferred embodiment, a continuous surface and therefore when the indenting flange is indented into the sheet or plate member, it not only causes a flow into engagement with the projection for substantially the entire circumferential extent of the projection but it does not tend to set up undesirable stress concentrations in the receiving member. Moreover, the nature of the polygonal central projection 13 is such that the adjacent sides do not define sharp corners which tend to set up stress concentrations. The included angles between the sides of the central projection 13 are obtuse angles which tend to minimize stress concentrations. While the central projection preferably approaches circularity, the angle between adjacent sides is such that the projection will securely hold the nut against rotation in the sheet or plate member.

Figure 3:
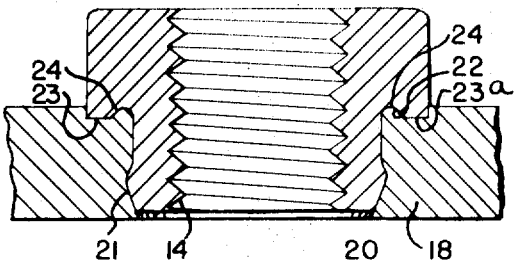
FIG. 3 is a cross-sectional view taken approximately along line 3—3 of FIG. 1 but showing the nut in assembled relationship.
Figure 2:
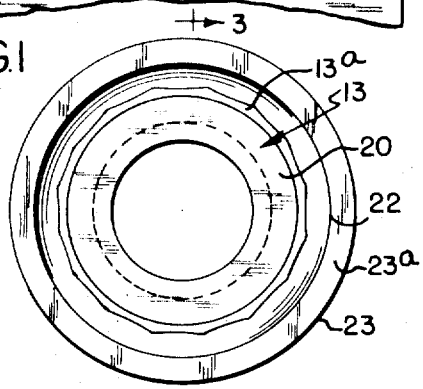
FIG. 2 is viewed looking from approximately line 2—2 of FIG. 1.

The length of the projection 13 is such that the end face 20 is preferably flush with or within the sheet or plate member when the nut is inserted into the member as is shown in FIG. 3. During insertion, the nut is backed by an anvil 26 or die member.

Figure 8:
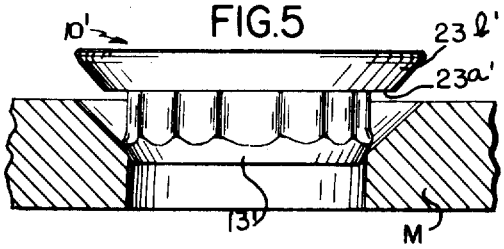
FIG. 8 is an elevational view of a modified form of a self-staking nut embodying the present invention with parts in section.
Figure 7:
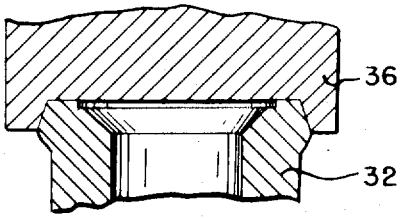

A self-staking nut embodying the present invention may be modified for use with the parent member having a counter-sunk receiving opening. Such a modified nut is illustrated in FIG. 8. The nut 10' comprises a head portion having an indenting flange 23' which is formed to permit the nut, in its assembled condition, to be flush with the surface of a sheet or plate member having a prepunched counter-sunk receiving opening. The indenting flange 23' includes a continuous annular bearing surface 23a' extending between the projection 13' and an upwardly diverging frusto-conical surface 23b' which is formed to correspond with the frusto-conical counter-sunk receiving opening in the parent member. The bearing surface 23a' provides a controlled indenting area such that as the nut is advanced into the receiving opening the bearing surface will engage and indent the frusto-conical wall of the counter-sunk opening to flow the material of the parent member into engagement with the periphery of the projection 13'. The projection 13' of the nut 10' is of the same construction as the projection 13 of the nut 10, previously described.

Figure 4:
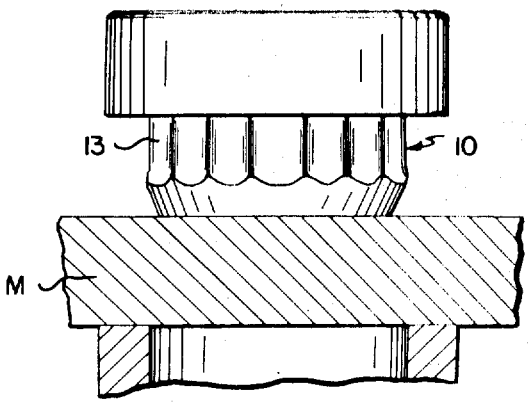
FIG. 4 is an elevational view with parts in section showing a nut embodying the present invention to prepunch its receiving opening in a parent member.

Conventional dies and punches are commonly used to prepunch openings in sheet metal or plate members for receiving the nuts. Rather than using a punch to prepunch a receiving hole, the nut itself may be used with the conventional punch die to punch the receiving opening for the nut as is iluustrated in FIG. 4. The punch die will have a nominal opening approximately the same as the nominal opening of the opening to be punched and the outer end face 20 of the polygonal projection 13 is designed to cooperate as a punch with the punch die.

As stated above, the outer end portion of the central projection is preferably more circular than the polygonal shank portion and the circularity is such that the clearance between the outer end of the projection and circular die is preferably not more than 10% of the thickness of the sheet material to assure clean punching. It will be understood that the projection 13 is not actually received in the die during punching since it does not project outwardly of the plate or sheet member. The clearance specified however is lateral clearance which would be present if the outer end of projection were disposed at the outer end of the opening in the punch die.

By providing the described polygonal configuration on the shank portion of the projection 13, maximum strength is obtained in the projection 13 for acting as a punch in cooperation with the punch die even though the shank portion is used to hold the insert against rotation. This enables nuts or other inserts embodying the present invention to be used to punch receiving openings in materials of considerable greater thickness than heretofore possible.

To provide maximum strength in the nut, the nut is preferably a cold forged nut. One of the problems confronting the industry in forming a cold forged nut as described is the problem of providing both the head portion and the bulge 18.

It has been found that the nut may be formed by first cold forging a metal slug in a die cavity to form a blank 29 with the general exterior configuration of the nut without the bulge 18 but with an axially extending skirt 32 which is polygonal in configuration to correspond to the shank portion.

Figure 5:
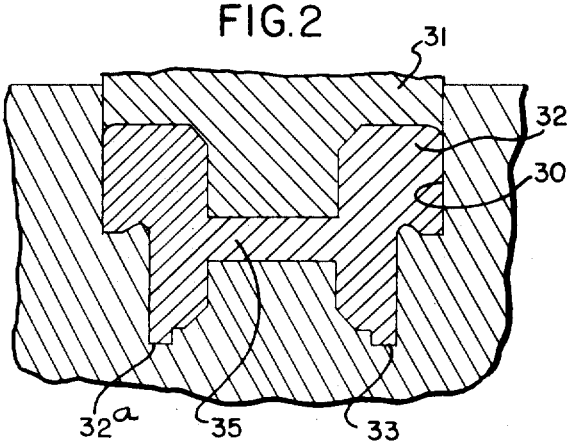
FIG. 5 is a cross-sectional view of tooling for cold forming the nut blank for the nut shown in FIG. 1.

Referring to FIG. 5, a die cavity 30 illustrated which has a configuration for forming, in cooperation with a punch 31, a blank 32 having the exterior configuration of the nut without the bulge 18. The die cavity has a polygonal recess 33 in the bottom of the die cavity and forming an extension of the sides of the cavity for forming the axially extending polygonal skirt 32a about the periphery of the outer end of the central projection of the nut blank which is to be upset to form the bulge 18. As illustrated in FIG. 5, the punch member in cooperation with a projection in the die cavity also forms the central opening through the blank except for a web portion 35.

Figure 6:
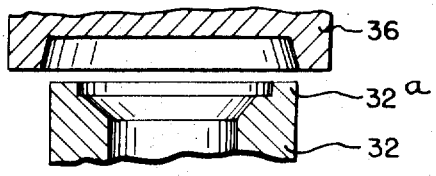
FIGS. 6 and 7 illustrate upsetting operations during the manufacture of the nut in FIG. 1.

The blank formed in the die cavity 30 is removed from the die cavity 30 by moving the blank axially out of the cavity and the web portion may then be removed by a suitable punching operation. After the web portion is removed, the skirt is unset with an upsetting member 36 which is moved against the end of the blank while the sides of the blank are substantially unrestrained. The upsetting member is illustrated in FIG. 6 and has a flanged portion defining the 15° taper to control the flow of the material in the skirt to form the bulge. Initial attempts in upsetting the entire end of the blank to provide a bulge did not provide a satisfactory bulging without a distortion of the axial opening but when the circumferential skirt was provided adjacent the outer periphery of the outer end of the central projection 13 and this skirt upset with an upsetting member having a wall defining the frustoconical portion 21, it was found that a high satisfactory bulge was formed without distorting the axial opening.

Having described our invention, we claim:

1. An insert adapted to be disposed in a hole in a plate or sheet member which is prepunched and of given diameter [and] *or* which is adapted to punch a receiving hole during insertion in a metal plate or sheet member comprising a body having a head portion and a central projection to be received in the hole extending outwardly from the head portion, said head portion extending laterally from said central projection and said central projection comprising a shank portion having major and minor diameters, said minor diameter having a diametrical extent which is at least 80 percent of said major diameter and the radial distance between said diameters being no less than about 0.003 inch, said shank having a noncircular continuous peripheral surface with adjacent portions of said surface having high and low parts corresponding with said major and minor diameters respectively, said projection flaring laterally to a bulge portion remote from said head and of a greater transverse dimension than said shank portion, said shank portion being of substantially uniform cross-section throughout its length with the configuration of said noncircular peripheral surface being discontinuous in an axial direction at said bulge portion and said bulge portion having a maximum transverse dimension larger than said given diameter and a tapering portion tapering inwardly in a uniform manner from said bulge portion toward an outer end face of said projection, said tapering portion being approximately circular adjacent *to the end thereof closer to* the outer end face of said projection and tapering at an angle about 15 degrees with respect to a longitudinal axis of said projection, [and means on] said head portion [outwardly of said projection for indenting the metal of a plate member and effecting] *being adapted to effect a* flow of the material of said member inwardly around said shank portion.

2. An insert adapted to be disposed in a hole in a metal plate or a sheet member which is prepunched and of a given diameter [and] *or* which is adapted to punch a receiving hole during insertion into a metal plate or sheet member comprising a body having a head portion and a central projection to be received in the hole extending outwardly from the head portion, said head portion extending laterally of said central projection and said central projection comprising a shank portion having major and minor diameters, said minor diameter having a diametrical extent which is at least 80 percent of said major diameter and the radial distance between said diameters being no less than about 0.003 inch, said shank having a noncircular continuous peripheral surface with adjacent portions of said surface having high and low parts of different radius in cross-section and with the angle between any high part and an adjacent low part being no less than about 55 degrees with respect to a radius of said diameters through the high part, a bulge portion on said central projection [at an end thereof] remote from said head of greater transverse dimension than said shank portion and of greater transverse dimension than said given diameter, and a tapering portion tapering inwardly from the bulge portion toward an outer end face of the projection, said tapering portion being approximately circular adjacent *to the end thereof closer to* the outer end face, [and means on] said head portion [outwardly of said projection for effecting] *being adapted to effect a* flow of the material of a plate or sheet member inwardly around said shank portion [, the outer end of said projection having a maximum transverse dimension approximately equal to said major diameter and being received in a hole of said given diameter].

3. An insert as defined by claim 2 wherein said tapering portion tapers at an angle which is no more than about 15 degrees with respect to the longitudinal axis of said insert.

4. An insert as defined in claim 2 wherein the configuration of said shank portion is substantially polygonal with adjacent sides of the polygon joining to form inwardly facing angles of less than 180 degrees.

5. An insert adapted to be disposed in a hole in a metal plate or sheet member which is pre-punched and of a given diameter [and] *or* which is adapted to punch a receiving opening on insertion into a metal plate or sheet member comprising a body having a head portion and a central projection to be received in the hole extending outwardly from the head portion, said head portion extending laterally of said central projection and said central projection comprising a substantially polygonal shank portion adjacent said head having a bulge portion [at the end] remote from said head head of greater transverse dimension than said shank portion and of a transverse dimension greater than said given diameter, said polygonal shank portion having a continuous peripheral surface with a minor diameter which is at least 80 percent of its major diameter with the configuration of said noncircular peripheral surface being discontinuous in an axial direction at said bulge portion, and a tapering portion tapering inwardly from the bulge portion toward an outer end face of the projection, said tapering portion being approximately circular adjacent *to the end thereof closer to* the outer end face, [and means on] said head portion [outwardly of said projection for indenting the metal of the plate member and effecting] *being adapted to effect* a flow of the metal inwardly around said shank portion[, the outer end of said projection having a maximum transverse dimension approximately equal to said diameter and being receivable in a hole of said diameter].

6. An insert as defined in claim 5 wherein said tapering portion tapers at an angle which is no more than 15 degrees with respect to the longitudinal axis of said insert.

7. An insert as defined in claim 5 wherein said projection is approximately round at the outer end face of said projection.

8. An insert as defined in claim 5 wherein said polygonal shank portion has a maximum transverse dimension approximately equal to the maximum transverse dimension of the outward face of said projection.

9. An insert as defined in claim 5 wherein said projection is approximately round at the outer end face of said projection.

10. An insert as defined in claim 5 wherein the insert is a cold forged nut.

11. *An insert adapted to be disposed in a hole in a metal plate or sheet member which is pre-punched and of a given diameter and which is adapted to punch a receiving opening on insertion into a metal plate or sheet member comprising a body having a head portion and a central projection to be received in the hole extending outwardly from the head portion, said head portion extending laterally of said central projection and said central projection comprising a substantially polygonal shank portion adjacent said head having a bulge portion at the end remote from said head of greater transverse dimension than said shank portion and of a transverse dimension greater than said given diameter, said polygonal shank portion having a continuous peripheral surface with a minor diameter which is at least 80 percent of its major diameter with the configuration of said noncircular peripheral surface being discontinuous in an axial direction at said bulge portion, and a tapering portion tapering inwardly from the bulge portion toward an outer end face of the projection, said tapering portion being approximately circular adjacent the outer end face and means on said head portion outwardly of said projection for indenting the metal of the plate member and effecting a flow of the metal inwardly around said shank portion, the outer end of said projection having a maximum transverse dimension approximately equal to said diameter and being receivable in a hole of said diameter, and wherein said tapering portion tapers at an angle which is no more than 15 degrees with respect to the longitudinal axis of said insert, and* [An insert as defined in claim 5] wherein said means on said head comprises an axially extending flange having a substantially continuous bearing surface for engaging the metal plate or sheet to indent the latter and a side surface facing said polygonal shank portion for directing metal inwardly against said shank portion for substantially the complete circumferential extent thereof adjacent said head portion.

12. An insert as defined in claim 11 wherein said projection is approximately round at the outer end face of said projection.

13. An insert as defined in claim 11 wherein said tapering portion tapers at an angle which is no more than 15 degrees with respect to the axis of said opening.

14. An insert as defined in claim 13 wherein said projection is approximately round at the outer end face of said projection.

References Cited

The following references, cited by the Examiner, are of record in the patented file of this patent or the original patent.

UNITED STATES PATENTS

| | | | |
|---|---|---|---|
| 2,008,229 | 7/1935 | Sharp | 151—41.73 |
| 2,490,594 | 12/1949 | Madden | 151—41.73 |
| 2,722,259 | 11/1955 | Eckenbeck et al. | 151—41.73 |
| 3,117,611 | 1/1964 | Matthews | 151—41.73 |
| 3,171,196 | 3/1965 | Helitas | 29—520 |
| 3,240,100 | 3/1966 | Rose | 85—10 |

FOREIGN PATENTS

| | | | |
|---|---|---|---|
| 690,252 | 4/1953 | Great Britain | 151—41.72 |
| 947,097 | 1/1964 | Great Britain | 151—41.73 |
| 955,813 | 4/1964 | Great Britain | 24—432 |
| 987,578 | 3/1965 | Great Britain | 151—41.73 |
| 1,076,611 | 4/1954 | France | 151—41.73 |
| 1,091,566 | 10/1954 | France | 151—41.73 |
| 1,300,424 | 6/1962 | France | 151—41.73 |

MARION PARSONS, Jr., Primary Examiner

U.S. Cl. X.R.

29—432